(12) United States Patent
Farris et al.

(10) Patent No.: US 10,308,779 B2
(45) Date of Patent: Jun. 4, 2019

(54) METHOD OF FOAMING A MILLED PRECURSOR

(71) Applicant: NIKE, Inc., Beaverton, OR (US)

(72) Inventors: Bryan N. Farris, Beaverton, OR (US); David Turner, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 323 days.

(21) Appl. No.: 14/964,886

(22) Filed: Dec. 10, 2015

(65) Prior Publication Data

US 2017/0121480 A1    May 4, 2017

Related U.S. Application Data

(60) Provisional application No. 62/248,824, filed on Oct. 30, 2015.

(51) Int. Cl.

| C08J 9/04 | (2006.01) |
|---|---|
| B29D 35/12 | (2010.01) |
| C08J 9/12 | (2006.01) |
| A43B 13/12 | (2006.01) |
| B29D 35/14 | (2010.01) |
| B29C 64/00 | (2017.01) |

(Continued)

(52) U.S. Cl.
CPC .............. *C08J 9/04* (2013.01); *A43B 13/125* (2013.01); *B29C 44/3457* (2013.01); *B29C 64/00* (2017.08); *B29D 35/122* (2013.01); *B29D 35/142* (2013.01); *C08J 9/122* (2013.01); *B29K 2075/00* (2013.01); *B29K 2101/12* (2013.01); *B29K 2105/24* (2013.01); *B29K 2223/083* (2013.01); *B29L 2031/4821* (2013.01);

(Continued)

(58) Field of Classification Search
CPC ....... C08J 9/04; C08J 9/08; C08J 9/122; C08J 9/228; C08J 2205/06; C08J 2300/22; C08J 2203/06; B29C 64/00; B29D 35/122; B29D 35/142
See application file for complete search history.

(56) References Cited

U.S. PATENT DOCUMENTS

| 2,848,427 A | 8/1958 | Rubens |
|---|---|---|
| 3,140,266 A | 7/1964 | Peticolas |

(Continued)

FOREIGN PATENT DOCUMENTS

| CN | 1736285 | 2/2006 |
|---|---|---|
| CN | 101107300 A | 1/2008 |
| JP | 06107841 | 4/1994 |

OTHER PUBLICATIONS

Jan. 30, 2017—(WO) International Search Report and Written Opinion—PCT/US2016/058990.

*Primary Examiner* — Peter L Vajda
(74) *Attorney, Agent, or Firm* — Banner & Witcoff, Ltd.

(57) ABSTRACT

A method of making a foamed article comprises (a) milling a block or sheet of thermoplastic polymer to form a precursor; (b) crosslinking the thermoplastic polymer; (c) heating the precursor to a first temperature to soften the thermoplastic polymer; (d) infusing the thermoplastic polymer with at least one inert gas at a first pressure that is sufficient to cause the at least one inert gas to permeate into the softened thermoplastic polymer; and (e) while the thermoplastic polymer is softened, reducing the pressure to a second pressure below the first pressure to at least partially foam the precursor into a foamed article, wherein the foamed article is substantially the same shape as the precursor.

19 Claims, 3 Drawing Sheets

(51) Int. Cl.
   *B29C 44/34* (2006.01)
   *B33Y 10/00* (2015.01)
   *B29K 223/00* (2006.01)
   *B29L 31/48* (2006.01)
   *B29L 31/50* (2006.01)
   *B29L 31/00* (2006.01)
   *B29K 75/00* (2006.01)
   *B29K 101/12* (2006.01)
   *B29K 105/24* (2006.01)

(52) U.S. Cl.
   CPC ... *B29L 2031/504* (2013.01); *B29L 2031/751* (2013.01); *B29L 2031/768* (2013.01); *B33Y 10/00* (2014.12); *C08J 2201/026* (2013.01); *C08J 2201/032* (2013.01); *C08J 2203/06* (2013.01); *C08J 2205/06* (2013.01); *C08J 2207/00* (2013.01); *C08J 2300/22* (2013.01); *C08J 2300/26* (2013.01)

(56) References Cited

U.S. PATENT DOCUMENTS

| | | |
|---|---|---|
| 3,883,625 A | 5/1975 | Thomas et al. |
| 4,925,606 A | 5/1990 | Francis et al. |
| 6,232,354 B1 | 5/2001 | Tan |
| 7,699,726 B2 | 4/2010 | Avis |
| 8,221,877 B2 | 7/2012 | Saitou et al. |
| 8,314,160 B2 | 11/2012 | Masuda et al. |
| 8,623,930 B2 | 1/2014 | Ikeda et al. |
| 2007/0293592 A1* | 12/2007 | Jacobs ............ C08J 9/122 521/50.5 |
| 2008/0207782 A1* | 8/2008 | Jacobs ............ B29C 44/08 521/54 |
| 2009/0043002 A1 | 2/2009 | Masuda et al. |
| 2009/0292034 A1 | 11/2009 | Tomomatsu et al. |
| 2010/0052201 A1 | 3/2010 | Nadella |
| 2010/0178488 A1 | 7/2010 | Yasuda et al. |
| 2011/0275727 A1 | 11/2011 | Yamamoto et al. |
| 2013/0017391 A1 | 1/2013 | Kato et al. |
| 2014/0182170 A1* | 7/2014 | Wawrousek ........ A43B 7/14 36/103 |
| 2014/0246804 A1* | 9/2014 | Maranan ........... B29D 35/122 264/250 |
| 2014/0259329 A1 | 9/2014 | Watkins et al. |
| 2014/0259753 A1* | 9/2014 | Watkins ........... B29D 35/122 36/43 |
| 2014/0272379 A1 | 9/2014 | Watkins et al. |
| 2014/0275306 A1 | 9/2014 | Watkins et al. |
| 2015/0196982 A1* | 7/2015 | Caboni ............. B23C 3/00 425/4 R |

\* cited by examiner

METHOD OF FOAMING A MILLED PRECURSOR

This Application claims the benefit of U.S. Provisional Application 62/248,824, filed Oct. 30, 2015, which is hereby incorporated by reference in its entirety.

FIELD

The present disclosure relates to methods for forming flexible foams and articles made by the methods.

INTRODUCTION

This section provides background information related to the present disclosure which is not necessarily prior art.

Flexible foams are used for cushioning, support, and to absorb impacts, for example in seats and furniture, footwear, packaging, straps, protective gear, and so on. In general, foam materials are made in sheets or blocks and cut to a desired pre-form shape, then finished to a final shape.

Foamed midsoles for athletic footwear may be made from crosslinked poly(ethylene co-vinyl acetate) (EVA), for example, which may be cut from a block or sheet of foam. Injection molding may typically not be used because foam materials made by this method must have higher specific gravities to foam uniformly. A new mold in each size must be made to injection mold a foamed midsole of a new design.

DRAWINGS

The drawings described herein are for illustrative purposes only of selected embodiments and not all possible implementations, and are not intended to limit the scope of the present disclosure.

DESCRIPTION

Figure 1:
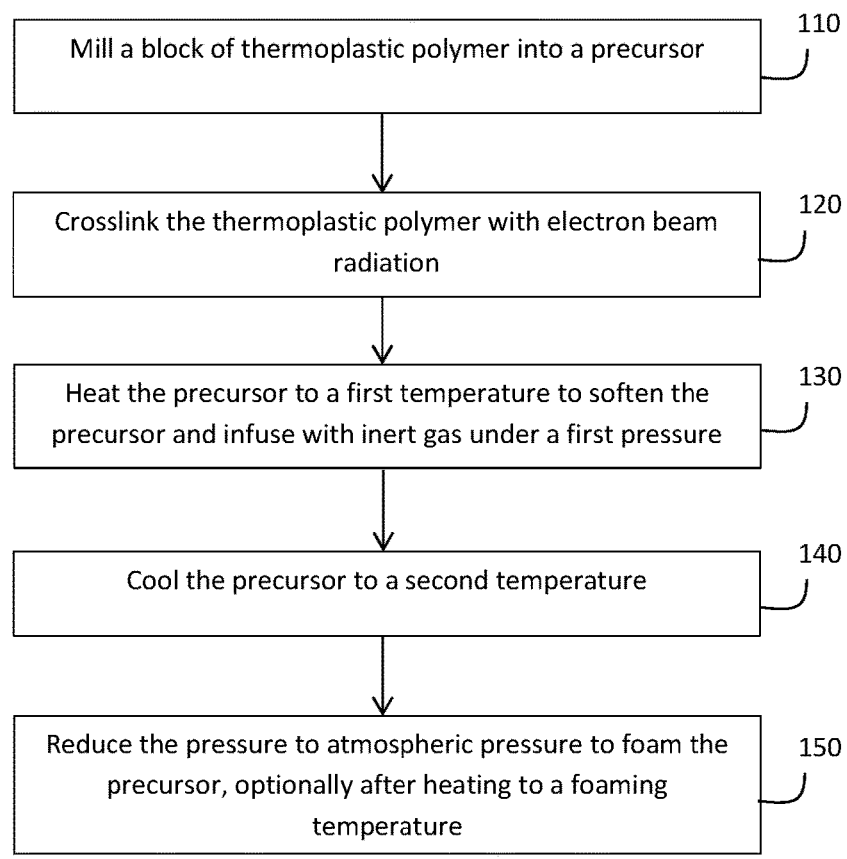
FIG. 1 shows a flow diagram for making a foamed article according to an embodiment of the present invention.

A method of making a foamed article, for example a foamed component for an article or footwear, comprises milling or cutting a block of unfoamed thermoplastic polymer to form a precursor. The precursor may be made by milling a block of unfoamed thermoplastic polymer material to a desired shape. In some embodiments, the block is milled by a computerized numeric control. The unfoamed thermoplastic polymer may be a thermoplastic elastomer composition. The precursor is foamed into a foamed article. The unfoamed precursor may be substantially the same shape as the foamed article, albeit with a smaller volume. "Substantially" is used here to indicate minor shape changes that occur during the foaming process. For example, when foaming, the precursor may lose some definition around edges, corners or other features. For example, when foaming, the precursor may lose some definition around edges, corners or other features. For example, a 90° corner of the precursor may not be as sharp in a foamed article because the corner may become slightly rounded during the foaming process. In some embodiments, the precursor is at least 20%, 30%, 40%, 50%, 60%, or 70% of the volume of the foamed article. In other embodiments, the volume of the precursor is up to 30%, 40%, 50%, 60%, 70%, or 80% the volume of the foamed article. The precursor and foamed article may be in the shape of a midsole for an article of footwear. The thermoplastic polymer of the precursor may be crosslinked before or after the precursor is foamed. To foam the precursor, the precursor is heated to a first temperature to soften the thermoplastic polymer, and then the softened precursor is infused with at least one inert gas at a first pressure. The first pressure may be greater than atmospheric pressure. The temperature to which the thermoplastic polymer is heated is sufficient to soften the thermoplastic polymer. The first pressure is sufficient to cause the at least one inert gas to permeate into the softened thermoplastic polymer, forming infused softened thermoplastic polymer. The inert gas may be a noble gas, nitrogen, carbon dioxide, or any combination thereof. The amount of the at least one inert gas infused into the softened thermoplastic polymer members is sufficient to produce at least partial foaming of the softened thermoplastic polymer in a subsequent step in which the infused softened thermoplastic polymer is exposed to a lower pressure. After being infused with the inert gas, the thermoplastic polymer can optionally be cooled to a second temperature, and the pressure reduced to atmospheric pressure (e.g., without foaming the thermoplastic polymer), then later heated again to foam the precursor and form the foamed article. The foamed article, for example a foamed component for an article or footwear, can be again heated to a temperature at which the thermoplastic polymer softens to at least partially foam the thermoplastic polymer. The foamed article can be heated under pressure (for example at a pressure greater than atmospheric pressure) to the temperature at which the thermoplastic polymer softens and foamed with a reduction of the pressure, for example a reduction to atmospheric pressure.

"Block" is used in this description to refer to a solid portion larger than the precursor. The block may be, for example, a sheet, chunk, cuboid, or other solid, i.e. unfoamed, portion of the thermoplastic polymer.

The foamed article, for example a foamed component for an article of footwear, can be again heated to a temperature at which the thermoplastic polymer softens to at least partially foam the thermoplastic polymer. The foamed article can be heated to a temperature at which the thermoplastic polymer softens under pressure (for example at a pressure greater than atmospheric pressure) and foamed with a reduction of the pressure, for example a reduction to atmospheric pressure.

A method of making a foamed article, for example a foamed component for an article of footwear, comprises milling a block of unfoamed thermoplastic polymer to form a precursor that contains a cavity. The precursor may be milled using a computerized numeric control. The block may be milled into a precursor for a foamed midsole. Before or following milling, the thermoplastic polymer may be crosslinked. An insert comprising thermoplastic polymer may then be placed in the cavity of the precursor. In some embodiments, insert is be printed into the cavity using a three-dimensional ("3D") printer. The precursor and insert are then heated so that the thermoplastic polymer of each is infused with at least one inert gas. The inert gas may be a noble gas, nitrogen, carbon dioxide, or any combination thereof. The insert may also be infused with the inert gas and foam at substantially the proportion as the precursor, or the insert may be of a material different from the precursor and may foam at a lesser or greater proportion as the precursor foams. The thermoplastic polymer of the insert may be a thermoplastic elastomer composition. Each of the insert and the precursor may independently be infused with inert gas below or up to a saturation point. In other words, each of the insert and the precursor may independently be infused with the inert gas at a concentration below the saturation point or at the saturation point. The precursor containing the insert is heated to a first temperature to soften the thermoplastic polymer of the precursor and the thermoplastic polymer of the insert and allow the precursor and the insert to at least partially foam. The thermoplastic polymer may be heated to the first temperature at a first pressure greater than atmospheric pressure, then the pressure may be reduced to a second pressure less than the first pressure to allow the thermoplastic polymer to at least partially foam.

An at least partially foamed article may be subjected to a second foaming step by heating the at least partially foamed article to a second temperature at which the thermoplastic polymer is softened and infusing the softened thermoplastic polymer with at least one inert gas at a third pressure that is sufficient to cause the at least one inert gas to permeate into the softened thermoplastic polymer, and then reducing the pressure to fourth pressure below the second pressure to further foam the thermoplastic polymer. The third pressure may be greater than atmospheric pressure. The second temperature may be the same as or different from the first temperature. The at least one inert gas used in the second foaming step may be the same as or different from the inert gas used in the original foaming step. Suitable examples of the inert gas are again noble gasses, nitrogen, carbon dioxide, or any combination of these. The amount of inert gas infused into the thermoplastic polymer may be below or up to a saturation point. The third pressure is sufficient to cause the at least one inert gas to permeate into the softened thermoplastic polymer and can be the same as or different from the first pressure. The pressure is reduced to a fourth pressure below the first pressure to further foam the thermoplastic polymer. The fourth pressure can be the same as or different from the second pressure. The second foaming step can produce a foamed article of a lower density. The second foaming step may also be used for further shaping the foamed article, for example when the second foaming step is carried out in a mold or with a partial mold.

The foamed article may include an insert. The precursor may be milled such that the precursor contains a cavity. An insert may be placed in the cavity. In some embodiments, the insert is printed into the cavity using a 3D printer. The insert may comprise a thermoplastic polymer. In some embodiments, the insert is the same material as the precursor. The insert may also be infused with the inert gas and foam at substantially the proportion as the precursor.

The foamed article may be incorporated as cushioning into other articles. As nonlimiting examples, the foamed article may be a foamed element in footwear, such as a part of a footwear upper, such as a foamed element in a collar, a midsole or a part of a midsole, or an outsole or a part of an outsole; foam padding in shinguards, shoulder pads, chest protectors, masks, helmets or other headgear, knee protectors, and other protective equipment; an element placed in an article of clothing between textile layers; or the foamed article may be used for other known padding applications for protection or comfort, such as for a pillow, cushion, or in an article or furniture. In various embodiments, the foamed article is a midsole for an article of footwear. A midsole provides cushioning in the footwear. A midsole should be durable but also preferably adds as little weight as possible to the footwear while still cushioning to the desired degree. A midsole also should be able to be bonded to an outsole, an upper, or any other components (e.g., a shank, an airbag, or decorative components) in making an article of footwear.

As used in this description, "a," "an," "the," "at least one," and "one or more" indicate interchangeably that at least one of the item is present; a plurality of such items may be present unless the context unequivocally indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the technological field with this ordinary meaning, then "about" as used herein indicates at least variations that may arise from ordinary methods of measuring and using such parameters. In addition, disclosure of ranges are to be understood as specifically disclosing all values and further divided ranges within the range. The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

FIG. 1 shows a flow diagram for making a foamed article according to one embodiment of the present invention. In the first step 110, a block of thermoplastic polymer is milled to a desired shape to create a precursor. Then, the polymer of the precursor is crosslinked in step 120. In some embodiments, the polymer of the precursor is crosslinked prior to milling. In one embodiment, the crosslinking is performed by subjecting the precursor to electron beam radiation. In step 130, the article is then heated to a first temperature to soften the article and infuse the article with an inert gas at a first pressure. The inert gas may be a noble gas, nitrogen, carbon dioxide, or any combination of these. The first pressure is sufficient to cause the at least one inert gas to permeate into the softened thermoplastic polymer. The first exposure is at a pressure and for a duration of time sufficient for an amount of the gas to permeate into the softened polymer to cause at least partial foaming when the pressure is reduced. The amount of gas required may depend upon factors such as the surface area of the precursor, the type of polymer, the pressure, and the temperature. The infusing step may be continued until the point of saturation of the thermoplastic polymer with the gas. The article is then cooled to a second temperature in step 140. Finally in step 150, the pressure is decreased to a second pressure less than the first temperature to induce foaming. The second temperature is one at which the gas will not significantly foam the thermoplastic polymer in a desired length of time. For example, the second temperature may be at or below about 30° C. The second pressure may be atmospheric pressure. The article is then at least partially foamed. The precursor may optionally be heated to a foaming temperature during step 150. The foaming temperature is a temperature that aids in foaming the precursor. The foaming temperature may be greater than room temperature. The article is then at least partially foamed.

Figure 2:
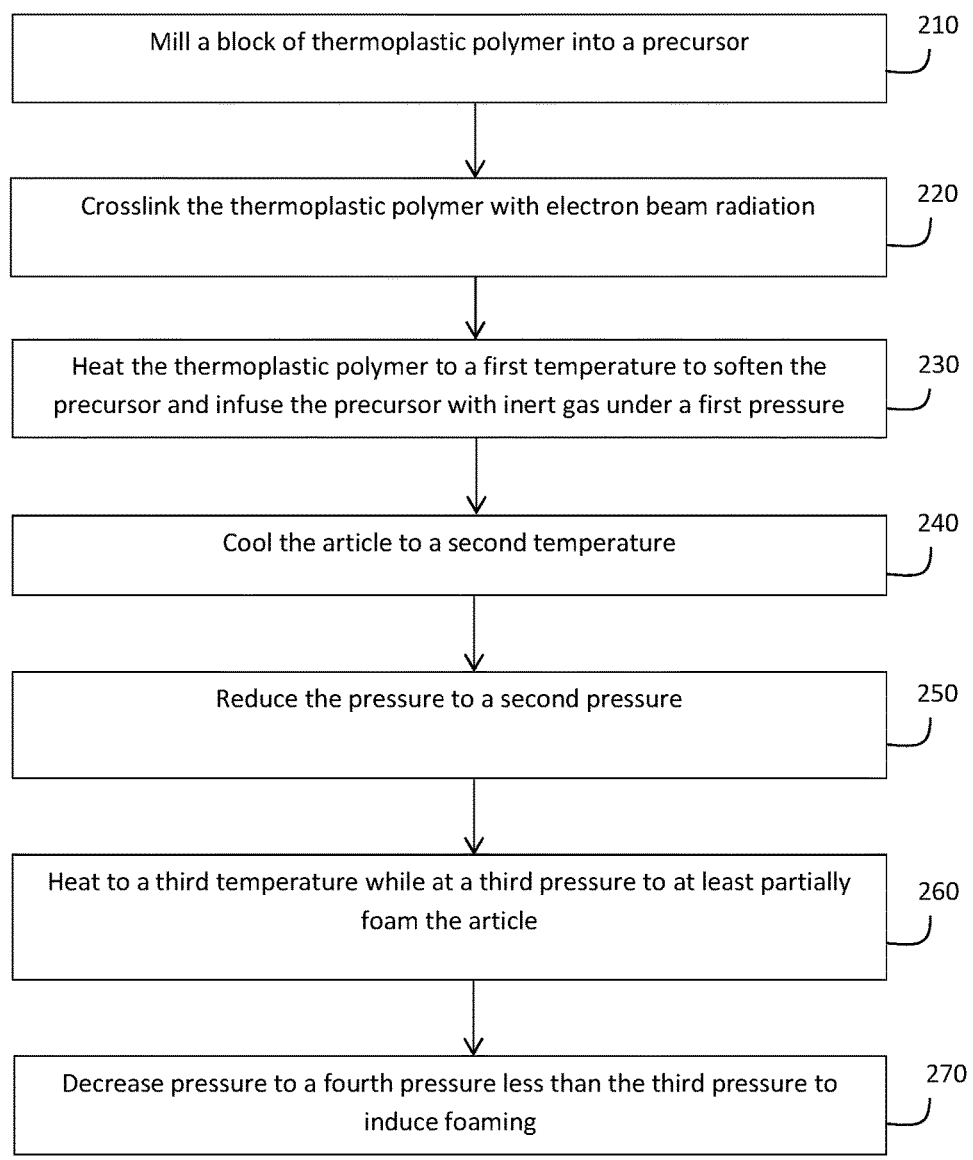
FIG. 2 shows a flow diagram for making a foamed article according to an embodiment of the present invention.

FIG. 2 shows a flow diagram for making a foamed article according to another embodiment of the invention. First, in step 210 a precursor is made by milling a block of thermoplastic polymer to a desired shape. Then the polymer is crosslinked in step 220. The precursor is next heated to a first temperature to soften the precursor and infuse the precursor with an inert gas at a first pressure in step 230. The inert gas may be a noble gas, nitrogen, carbon dioxide, or any combination of these. The first pressure is sufficient to cause the at least one inert gas to permeate into the softened thermoplastic polymer. The first exposure is at a pressure and for a duration of time sufficient for an amount of the gas to permeate into the softened polymer to cause at least partial foaming when the pressure is reduced. The amount of gas required may depend upon factors such as the surface area of the precursor, the type of polymer, the pressure, and the temperature. The infusing step may be continued until the point of saturation of the thermoplastic polymer with the gas. The infused precursor is then cooled to a second temperature in step 240. Then, in step 250, the pressure is decreased to a second pressure. In step 260, the precursor is heated to a third temperature while at a third pressure to at least partially foam the precursor. While remaining at the third temperature, the pressure is decreased to a fourth pressure to induce foaming.

Figure 3:
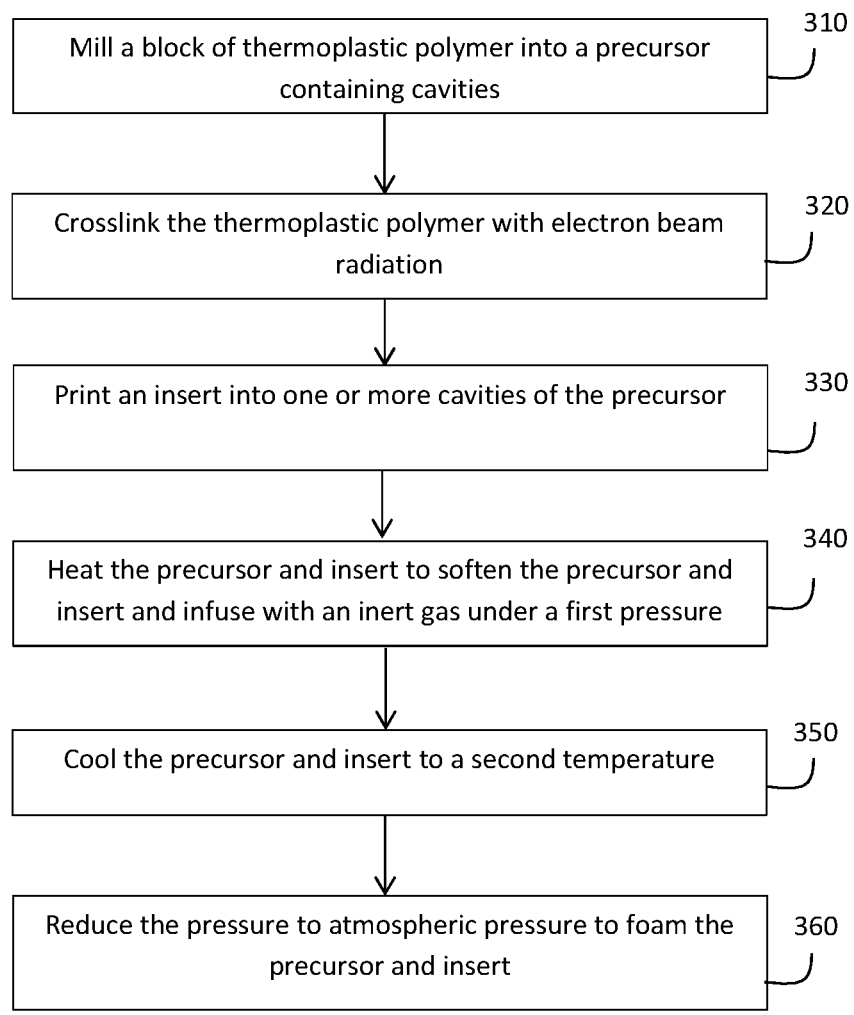
FIG. 3 shows a flow diagram for making a foamed article with an insert according to an embodiment of the present invention.

FIG. 3 illustrates a method for making a foamed article with an insert according to an embodiment of the present invention. In step 310, a block of thermoplastic polymer is milled into a precursor. The precursor may have cavities to allow for an insert to be placed into the precursor. In some embodiments, the milling is performed by a computerized numeric control (CNC) machine. Then, in step 320, the thermoplastic polymer is crosslinked. In some embodiments, the crosslinking is completed using electron beam radiation. In step 330, an insert is placed into a cavity of the precursor. The precursor may contain one or more cavities for inserts to be included. In some embodiments, the insert is printed into the cavity. In further embodiments, the insert is printed into the cavity using a three-dimensional ("3D") printer. Then, in step 340, the precursor and any inserts are heated to soften the precursor and insert, and then an inert gas is introduced to the precursor and insert at a first pressure. The inert gas may be a noble gas, nitrogen, carbon dioxide, or any combination of these. The first pressure is sufficient to cause the at least one inert gas to permeate into the softened thermoplastic polymer. The first exposure is at a pressure and for a duration of time sufficient for an amount of the gas to permeate into the softened polymer to cause at least partial foaming when the pressure is reduced. The amount of gas required may depend upon factors such as the surface area of the precursor, the type of polymer, the pressure, and the temperature. The infusing step may be continued until the point of saturation of the thermoplastic polymer with the gas. In step 350, the precursor and insert are cooled to a second temperature. Finally, in step 360, the pressure is reduced to atmospheric pressure to foam the precursor and insert. In some embodiments, the precursor may undergo additional foaming steps.

The precursor for the foamed article is milled from a block of thermoplastic polymer. The milling may be performed by a computerized numeric control ("CNC") machine. Using a CNC machine to prepare the precursor creates a shaped precursor which may be foamed to provide a full-size foamed article. Milling an article after foaming may cause scorching of the material. Milling a block of thermoplastic polymer before foaming may also allow for controlling the edges and corners of the precursors, allowing for a non-defective final part normally caused by curling or other expansion limitations. CNC milling of an unfoamed precursor may also allow for the capture of scrap material for recycling and reuse, and does not require building a mold. The milled precursor is in a desired shape that is substantially the same shape as the foamed article. In some embodiments, the precursor has a smaller volume than the volume of the foamed article. In some embodiments, the precursor may be shaped like a midsole for an article of footwear. Once the precursor is foamed to full-size, the foamed article may be suitable for use as a midsole for an article of footwear. In other embodiments, the foamed article may be a footwear upper, footwear collar, footwear tongue, footwear insole, shinguard, shoulder pads, chest protector, mask, helmet, headgear, knee protector, article of clothing, strap, furniture cushion, or bicycle seat.

Partial molds, having a surface that limits foam expansion in at least one direction but less than all directions, may optionally be used during the foaming step to further control the shape of the final part, for example to maintain a flat face or sharp edge. A partial mold does not fully enclose the article during foaming. As the article is not fully enclosed during the foaming, the infused gas present in the article is able to escape from at least a portion of an outer surface of the article, and from the partial mold. The partial mold may be adjacent to the article before foaming begins or the article may come into contact with a surface of the partial mold during foaming to prevent the article from expanding further during foaming in the direction of the surface of the partial mold. The surface of the partial mold that limits foam expansion may be flat and may optionally include one or more spaces through which the structure can expand beyond the surface during foaming. The outer surfaces of the article before the foaming may define a top, a bottom opposite the structure top, and an outer circumference between the top and the bottom, and the surface of the partial mold may limit foam expansion of at least a part of the outer circumference. The surface of the partial mold may limit foam expansion to expansion in directions of the top or the bottom or both the top and the bottom. In another example, the partial mold may have a bottom surface and a side surface or side surfaces that limit foam expansion and may be open in a direction opposite the bottom surface. The partial mold may include a bottom portion and a side portion, and the side portion may or may not completely surround the article being foamed. The partial mold may have adjacent sections that separate during foaming of the precursor to form the foamed article. For example, the partial mold may have a first mold part comprising the bottom surface and a second mold part comprising the side surfaces, wherein the first and second mold parts are adjacent but not conjoined, in which case the second mold part may be moved away from the first mold part before unmolding the foamed article from the second mold part.

In any of these examples, the partial mold may have a surface that imparts a pattern or decoration on at least a portion of the foamed article. In any of these examples, the partial mold may have a shape of a midsole for footwear. The shape may be that of a perimeter of a midsole or a part of a perimeter of a midsole. In any of these examples, the partial mold may be of a sacrificial nature that is destroyed in removing the molded, foamed article. For example, the partial mold or a portion of the partial mold may be cut away or torn away after the article is molded. In another example, the partial mold or a portion of the partial mold may be melted or dissolved after the article is molded. In yet another example, the partial mold or a portion of the partial mold may become a part of the foamed article, for example the partial mold or a portion of the partial mold may be may become a layer or component of a midsole for footwear that is foamed and shaped by the partial mold. In such instances, the partial mold or a portion of the partial mold may be adhesively attached or physically attached during the foaming and molding process.

The thermoplastic polymeric composition can include any thermoplastic polymer, including thermoplastic elastomers that are suitable for the intended use of the foamed article to be made. Nonlimiting examples of suitable thermoplastic polymers and elastomers include thermoplastic polyurethane elastomers, thermoplastic polyurea elastomers, thermoplastic polyamide elastomers (PEBA or polyether block polyamides), thermoplastic polyester elastomers, metallocene-catalyzed block copolymers of ethylene and α-olefins having 4 to about 8 carbon atoms, and styrene block copolymer elastomers such as poly(styrene-butadiene-styrene), poly(styrene-ethylene-co-butylene-styrene), and poly(styrene-isoprene-styrene), and poly(ethylene co-vinyl acetate) (EVA).

Ethylene may also be copolymerized with vinyl acetate to make ethylene vinyl acetate copolymer. The vinyl acetate content of the copolymer may range from about 5 or 10 wt % up to about 40 or 45 wt % of the polymer weight.

Thermoplastic polyurethane elastomers may be selected from thermoplastic polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of a polymeric diol (polyester diol, polyether diol, polycaprolactone diol, polytetrahydrofuran diol, or polycarbonate diol), one or more polyisocyanates, and, optionally, one or more chain extension compounds. Preferably the polymeric diol-based polyurethane is substantially linear (i.e., substantially all of the reactants are difunctional). Diisocyanates used in making the polyurethane elastomers may be aromatic or aliphatic, and examples include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, and the like, which may be used in combinations. Chain extension compounds, or extenders, have two functional groups reactive with isocyanate groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders may range from about 60 to about 400. Alcohols and amines are typically used. Examples of useful diols include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, and combinations of these. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred embodiments, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides. Polylactones, such as polycaprolactone diol, may also be used.

A polymeric polyether may be obtained by reacting a diol initiator, e.g., 1,3-propanediol or ethylene or propylene glycol, with alkylene oxide chain-extension reagent. Polyethylene oxide (also called polyethylene glycol), polypropylene oxide (also called polypropylene glycol), and block polyethylene oxide-polypropylene oxide copolymers may be used. Two or more different alkylene oxide monomers may be randomly copolymerized by coincidental addition or polymerized in blocks by sequential addition. Tetrahydrofuran may be polymerized by a cationic ring-opening reaction initiated by formation of a tertiary oxonium ion. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

The polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274. The polymeric diol segments typically are from about 35% to about 65% by weight of the polyurethane polymer, and preferably from about 35% to about 50% by weight of the polyurethane polymer.

Suitable thermoplastic polyurea elastomers may be prepared by reaction of one or more polymeric diamines with one or more of the polyisocyanates already mentioned and one or more of the diamine extenders already mentioned. Polymeric diamines include polyoxyethylene diamines, polyoxypropylene diamines, poly(oxyethylene-oxypropylene) diamines, and poly(tetramethylene ether) diamines.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylylenediamine, or any of the other diamines already mentioned; (2) a ring-opening polymerization of a cyclic lactam, such as ε-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide blocks include NYLON 6, NYLON 66, NYLON 610, NYLON 11, NYLON 12, copolymerized NYLON, NYLON MXD6, and NYLON 46.

Thermoplastic polyester elastomers have blocks of monomer units with low chain length that form the crystalline regions and blocks of softening segments with monomer units having relatively higher chain lengths. Thermoplastic polyester elastomers are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil under the tradename Exact™ and from the Dow Chemical Company under the tradename Engage™.

Styrene block copolymer elastomers such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

In some embodiments, the thermoplastic polymer is crosslinked before foaming. The method of crosslinking may vary based on the thermoplastic polymer used in the method. In some embodiments, the thermoplastic polymer is crosslinked using radiation, such as ultraviolet (UV) radiation or electron beam radiation. For example, the thermoplastic polymer may be crosslinked after the precursor is formed.

The precursor is infused with an inert gas by heating the thermoplastic polymer to a first temperature soften the thermoplastic polymer and infusing the softened thermoplastic polymer with at least one inert gas at a first pressure greater than atmospheric pressure that is sufficient to cause the at least one inert gas to permeate into the softened thermoplastic polymer. The inert gas may be a noble gas, nitrogen, carbon dioxide, or any combination of these. The first pressure is sufficient to cause the at least one inert gas to permeate into the softened thermoplastic polymer. The first exposure is at a pressure and for a duration of time sufficient for an amount of the gas to permeate into the softened polymer to cause at least partial foaming when the pressure is reduced. The amount of gas required may depend upon factors such as the surface area of the precursor, the type of polymer, the pressure, and the temperature. The infusing step may be continued until the point of saturation of the thermoplastic polymer with the gas.

The precursor having the thermoplastic polymer infused with the inert gas may then be cooled to a second temperature. The second temperature is one at which the gas will not significantly foam the thermoplastic polymer in a desired length of time. For example, the second temperature may be at or below about 30° C. Then, the pressure is reduced to a second pressure. The second pressure may be atmospheric pressure. The precursor then is foamable. The precursor can be removed from the pressure vessel and transferred to another location, for example to a mold in the same building or manufacturing site or transferred to a remote site, before it is foamed. The precursor is then foamed by heating the thermoplastic polymer at a third pressure to a third temperature to soften the thermoplastic polymer to cause the thermoplastic polymer to at least partially foam the thermoplastic polymer. The third temperature may be the same as or different from the first temperature at which the thermoplastic polymer was infused with the inert gas. Once the third temperature is reached, the pressure is reduced to a fourth pressure or released (returned to atmospheric temperature) to cause the thermoplastic polymer to foam.

The precursor having the thermoplastic polymer infused with the inert gas may instead be foamed immediately without interim cooling or moving or transferring to a different position, piece of equipment, location, or geographic site. Once the softened thermoplastic polymer has been infused with the at least one inert gas, the pressure is reduced to a second pressure below the first pressure to at least partially foam the thermoplastic polymer. The thermoplastic polymer remains softened while foaming. For example, the second pressure may be atmospheric pressure.

When the precursor is foaming, expansion of the precursor in one or more but less than all directions may be constrained, for example by placing the article with the precursor of thermoplastic polymer adjacent to or in direct contact with an unyielding surface, such as a partial mold as already described. The foaming precursor may partially conform to the unyielding surface as it presses during foaming against the surface, expanding in unconstrained directions.

The foamable thermoplastic polymer may be foamed a second time by repeating the process. The at least partially foamed, thermoplastic polymer is heated to a second temperature to soften the thermoplastic polymer and the softened thermoplastic polymer is again infused with at least one inert gas at a third pressure that is sufficient to cause the at least one inert gas to permeate into the softened thermoplastic polymer, then the pressure is reduced to a fourth pressure below the third pressure while the thermoplastic polymer is softened to further foam the thermoplastic polymer. The third pressure may be greater than atmospheric pressure. The second temperature may be the same as or different from the first temperature at which the thermoplastic polymer was softened and infused during the original foaming process. The inert gas used in the second foaming process may be the same as or different from the inert gas used to originally at least partially foam the thermoplastic polymer. Thus, the inert gas may be a noble gas, nitrogen, carbon dioxide, or any combination of these. The amount of inert gas infused into the thermoplastic polymer may be up to a saturation point. The third pressure may be the same as or different from the first pressure used in the original infusing step process, so long as it is sufficient to cause the at least one inert gas to permeate into the softened thermoplastic polymer. The pressure can be reduced to a fourth pressure while the thermoplastic polymer is softened to allow the thermoplastic polymer to further foam. The fourth pressure may be atmospheric pressure.

The foamed article may be substantially the same shape as the precursor, though the foamed article may have an increased volume with respect to the precursor. In some embodiments, the precursor is at least 20% or at least 30% or at least 40% or at least 50% or at least 60% or at least or 70% of the volume of the foamed article. In other embodiments, the volume of the precursor is up to 30% or up to 40% or up to 50% or up to 60% or up to 70% or up to 80% of the volume of the foamed article. For example, in various embodiments the precursor may be at least 20% and up to 80% of the volume of the foamed article or the precursor may be at least 20% and up to 70% of the volume of the foamed article or the precursor may be at least 20% and up to 60% of the volume of the foamed article or the precursor may be at least 20% and up to 50% of the volume of the foamed article or the precursor may be at least 30% and up to 80% of the volume of the foamed article or the precursor may be at least 30% and up to 70% of the volume of the foamed article or the precursor may be at least 30% and up to 60% of the volume of the foamed article or the precursor may be at least 30% and up to 50% of the volume of the foamed article or the precursor may be at least 40% and up to 80% of the volume of the foamed article or the precursor may be at least 40% and up to 70% of the volume of the foamed article or the precursor may be at least 40% and up to 60% of the volume of the foamed article or the precursor may be at least 40% and up to 50% of the volume of the foamed article.

The precursor may be molded such that the precursor contains a cavity or a plurality of cavities. An insert may then be inserted into the cavity or cavities prior to foaming. The insert may be printed into the cavities using a 3D printer. The insert may be polymeric and may be foamed along with the precursor. The insert may comprise the same thermoplastic polymer as the precursor comprises or may comprise a second thermoplastic polymer different from the thermoplastic polymer of the precursor. The insert may be infused with the inert gas while the precursor is being infused with the inert gas. The insert may then foam substantially the same amount in proportion to the precursor, or the insert may foam a different amount proportionally than the precursor. The insert may provide aesthetic details or structural support to the foamed article.

In some embodiments an insert is printed onto the precursor using a 3D printer. Any suitable 3D printer may be used in the method for printing an insert onto the precursor. An example of a suitable printer may be found, for example, in U.S. Pat. No. 9,005,710, the subject matter of which is herein incorporated by reference. The 3D printer may be used to print a three dimensional insert onto the precursor, or in a cavity of the precursor. The insert may be the same or a different polymeric material as the precursor. In some embodiments, the insert is infused with the inert gas similarly to the precursor. In further embodiments, the insert foams an amount that is proportional to the precursor.

Among the foamed articles that may be made in this way are footwear uppers, footwear collars, footwear tongues, footwear insoles, footwear midsoles, shinguards, shoulder pads, chest protectors, masks, helmets, headgear, knee protectors, articles of clothing, straps, furniture cushions, and bicycle seats.

In various embodiments, the foamed articles may be used as inserts in a further molding process, such as in a thermoforming process, or may be attached by adhesives, fasteners, thermally welded, or otherwise to further articles.

The foregoing description of particular embodiments illustrate features of the invention, but the invention is not limited to any of the specific embodiments that have been described. The features described for particular embodiments are interchangeable and can be used together, even if not specifically shown or described. The same may also be varied in many ways. The invention broadly includes such variations and modifications.

What is claimed is:

1. A method of making a foamed article, comprising:
   a) providing a block of a first thermoplastic polymer;
   b) milling the block of first thermoplastic polymer to form a precursor having a cavity;
   c) crosslinking the first thermoplastic polymer;
   d) placing an insert comprising a second thermoplastic polymer in the cavity of the precursor, wherein the insert is placed into the cavity of the precursor by printing with a 3D printer;
   e) infusing the precursor and the insert with at least one inert gas; and
   f) heating the precursor and the insert to foam the precursor and the insert into a foamed article.

2. The method according to claim 1, wherein the inert gas is nitrogen or carbon dioxide.

3. The method according to claim 2, wherein the inert gas is nitrogen.

4. The method according to claim 2, wherein the inert gas is carbon dioxide.

5. The method according to claim 1, wherein the milling is performed by computerized numeric control.

6. The method according to claim 1, further comprising heating the first thermoplastic polymer and the second thermoplastic polymer to soften the precursor and the insert prior to infusing with the inert gas.

7. The method according to claim 1, further comprising introducing the at least one inert gas at a first pressure to permeate into the precursor and the insert.

8. The method according to claim 7, further comprising reducing the pressure to a second pressure below the first pressure.

9. The method according to claim 1, further comprising:
   heating the foamed article to soften the foamed article and form a softened foamed article;
   infusing the softened foamed article with at least one inert gas at a pressure sufficient to cause the at least one inert gas to permeate into the softened foamed article; and
   reducing the pressure to further foam the softened foamed article.

10. The method according to claim 1, wherein the foamed article is a footwear midsole.

11. A method of making a foamed article, comprising:
a) milling a block of a first thermoplastic polymer to form a precursor having a cavity;
b) crosslinking the first thermoplastic polymer;
c) placing an insert comprising a second thermoplastic polymer in the cavity of the precursor, wherein the insert is placed into the cavity of the precursor by printing with a 3D printer;
d) heating the precursor and the insert to a first temperature to soften the precursor and the insert;
e) infusing the precursor and the insert with a first inert gas under a first pressure;
f) cooling the precursor and the insert to a second temperature below the first temperature; and
g) reducing pressure to a second pressure lower than the first pressure to foam the precursor and the insert into a foamed article.

12. The method according to claim 11, wherein the first inert gas is nitrogen.

13. The method according to claim 11, wherein the first inert gas is carbon dioxide.

14. The method according to claim 11, wherein the milling is performed by computerized numeric control.

15. The method according to claim 11, wherein the crosslinking utilizes electron beam radiation.

16. The method according to claim 11, wherein the foamed article is a footwear midsole.

17. The method according to claim 11, wherein the foamed article is a member selected from the group consisting of: a footwear upper, a footwear collar, a footwear tongue, and a footwear insole.

18. The method according to claim 11, further comprising:
heating the foamed article to a third temperature to soften the foamed article and form a softened foamed article;
infusing the softened foamed article with a second inert gas at a third pressure sufficient to cause the second inert gas to permeate into the softened foamed article; and
reducing pressure to a fourth pressure below the third pressure to further foam the softened foamed article.

19. The method according to claim 18, wherein the first inert gas is the same as the second inert gas.

* * * * *